United States Patent [19]

Chubb

[11] Patent Number: 4,582,676
[45] Date of Patent: Apr. 15, 1986

[54] COATING A URANIUM DIOXIDE NUCLEAR FUEL WITH A ZIRCONIUM DIBORIDE BURNABLE POISON

[75] Inventor: Walston Chubb, Franklin Twp., Westmoreland Co., Pa.

[73] Assignee: Westinghouse Electric Corp., Pittsburgh, Pa.

[21] Appl. No.: 468,743

[22] Filed: Feb. 22, 1983

[51] Int. Cl.$^4$ ............................................. G21C 3/00
[52] U.S. Cl. .................................. 376/414; 376/419; 376/417; 427/6
[58] Field of Search ............... 376/414, 416, 417, 419; 427/6

[56] References Cited

U.S. PATENT DOCUMENTS

| | | | |
|---|---|---|---|
| 3,427,222 | 2/1969 | Biancheria | 376/419 |
| 3,969,186 | 7/1976 | Thompson | 376/418 |
| 4,029,545 | 6/1977 | Gordon | 376/417 |
| 4,045,288 | 8/1977 | Armijo | 376/417 |

OTHER PUBLICATIONS

Holden, A. N.; "Dispersion Fuel Elements", American Society for Metals, 1967, pp. 17,18,30,31,45-49.

Primary Examiner—Donald P. Walsh
Attorney, Agent, or Firm—D. E. Erickson

[57] ABSTRACT

A method for coating a uranium dioxide nuclear fuel with a zirconium diboride burnable poison. First, a layer of niobium is bonded to the nuclear fuel. Then, a layer of zirconium diboride is deposited by chemical vapor deposition on the niobium layer. A zirconium diboride coated nuclear fuel having a layer of niobium between a uranium dioxide substrate and the zirconium diboride layer also is disclosed.

10 Claims, 2 Drawing Figures

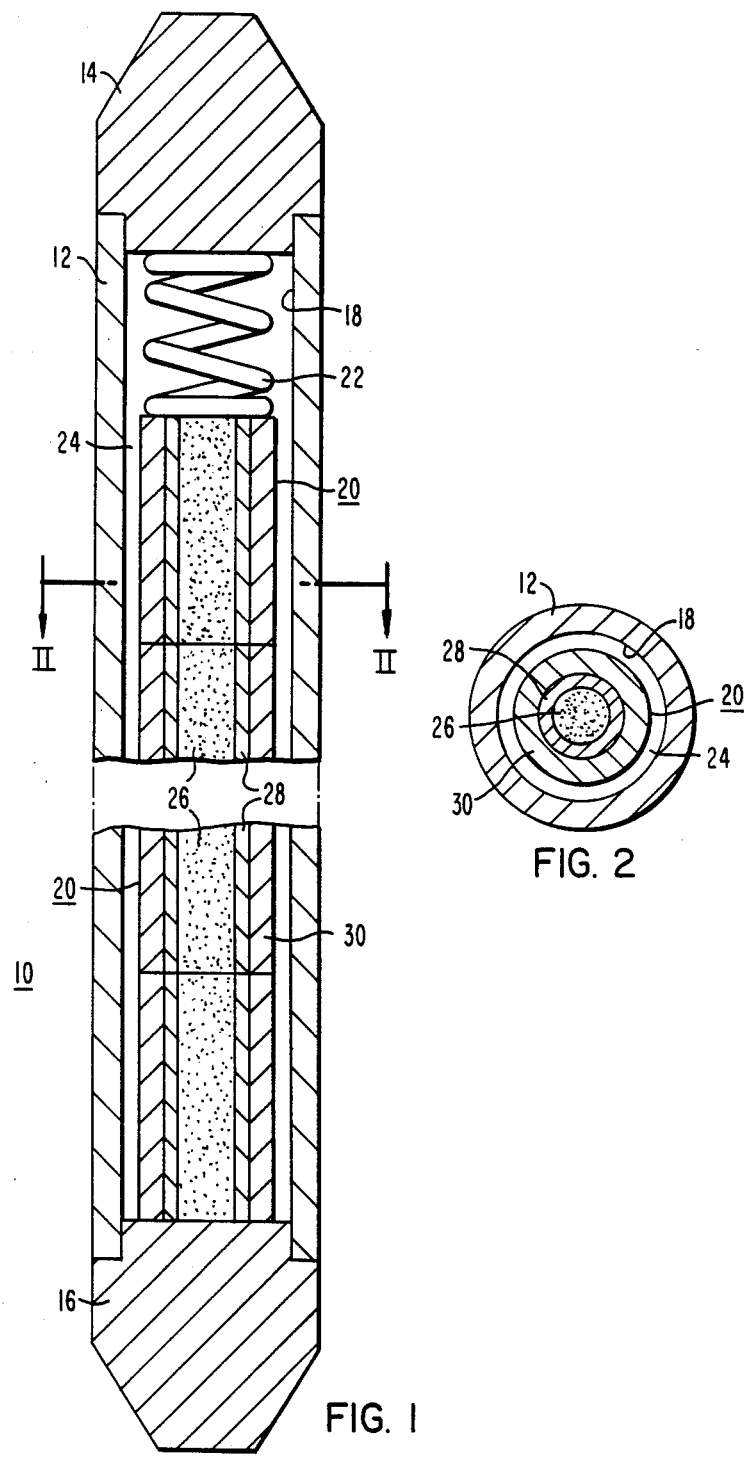

COATING A URANIUM DIOXIDE NUCLEAR FUEL WITH A ZIRCONIUM DIBORIDE BURNABLE POISON

BACKGROUND OF THE INVENTION

The present invention relates generally to burnable poisons for nuclear reactors and, more particularly, to a method for coating a uranium dioxide nuclear fuel with a zirconium diboride burnable poison and to a zirconium diboride coated uranium dioxide nuclear fuel.

It is known that nuclear fuel may have various shapes such as plates, columns, and even fuel pellets disposed in end-to-end abutment within a tube or cladding made of a zirconium alloy or stainless steel. The fuel pellets contain fissionable material, such as uranium dioxide or mixed uranium-plutonium dioxide. The fuel rods are usually clad with a zirconium alloy and are usually grouped together to form a fuel assembly. The fuel assemblies are arranged together to constitute the core of a nuclear reactor.

It is well known that the process of nuclear fission involves the disintegration of the fissionable nuclear fuel material into two or more fission products of lower mass number. Among other things the process also includes a net increase in the number of available free neutrons which are the basis for a self-sustaining reaction. When a reactor has operated over a period of time, the fuel assembly with fissionable material must ultimately be replaced due to depletion. Inasmuch as the process of replacement is time consuming and costly, it is desirable to extend the life of a given fuel assembly as long as practically feasible. For that reason, deliberate additions to the reactor fuel of parasitic neutron-capturing elements in calculated small amounts may lead to highly beneficial effects on a thermal reactor. Such neutron-capturing elements are usually designated as "burnable poisons" if they have a high probability (or cross section) for absorbing neutrons while producing no new or additional neutrons or changing into new poisons as a result of neutron absorption. During reactor operation the burnable poisons are progressively reduced in amount so that there is a compensation made with respect to the concomitant reduction in the fissionable material.

The life of a fuel assembly may be extended by combining an initially larger amount of fissionable material as well as a calculated amount of burnable poison. During the early stages of operation of such a fuel assembly, excess neutrons are absorbed by the burnable poison which undergoes transformation to elements of low neutron cross section which do not substantially affect the reactivity of the fuel assembly in the latter period of its life when the availability of fissionable material is lower. The burnable poison compensates for the larger amount of fissionable material during the early life of the fuel assembly, but progressively less poison captures neutrons during the latter life of the fuel assembly, so that a long life at relatively constant fission level is assured for the fuel assembly. Accordingly, with a fuel assembly containing both fuel and burnable poison in carefully proportioned quantity, an extended fuel assembly life can be achieved with relatively constant neutron production and reactivity.

Burnable poisons which may be used are boron, gadolinium, samarium, and europium, which upon the absorption of neutrons result in isotopes of sufficiently low neutron capture cross section so as to be substantially transparent to neutrons.

Incorporation of burnable poisons in fuel assemblies has been recognized in the nuclear field as an effective means of increasing fuel capacity and thereby extending core life. Burnable poisons are used either uniformly mixed with the fuel (i.e., distributed poison) or are placed discretely as separate elements in the reactor, so arranged that they burn out or are depleted at about the same rate as the fuel. Thus, the net reactivity of the core is maintained relatively constant over the active life of the core.

U.S. Pat. No. 3,427,222 discloses a uranium dioxide fuel pellet substrate coated with a mixture of uranium dioxide and a zirconium diboride burnable poison applied by a plasma-spraying technique (see column 4, "Example I"). That patent also disclosed a uranium dioxide fuel pellet substrate coated with the burnable poison boron applied by chemical vapor deposition, and the patent noted that the deposition rate was slow at low temperatures while the coating was not as adherent at high temperatures (see column 5, "Example III").

It is known that a nuclear fuel contained in an aluminum can may be coated with a layer of niobium to prevent the fuel from reacting with the can (British Pat. No. 859,206; page 1; lines 12–30). It is also known that minute nuclear fuel particles, such as uranium dioxide particles, may be coated with a single layer or several layers of the same or different non-poison materials, including niobium, for such purposes as protecting the fuel from corrosion and helping to retain the products of fission. The coatings may be applied by various techniques, such as depositing from a vapor of the coating material, depositing from a decomposing vapor, and electroplating (British Pat. No. 933,500).

Japanese Pat. No. 52-3999 discloses a nuclear fuel first coated with a thin layer of a material (such as niobium) to absorb fission fragments and then coated with a main coating material (such as Zircaloy). The patent apparently does not concern burnable absorber coatings, and is not relevant to the present invention.

In *Dispersion Fuel Elements,* an AEC Monograph by A. N. Holden published in 1967 by Gordon and Breach of New York, there is mentioned coating fuel particles in dispersion fuels to prevent interaction of the particles with the matrix and to retain fission products (page 30). Uranium dioxide coated with niobium by vapor-phase reduction is disclosed (page 48). Also disclosed is uranium dioxide coated with chromium, by vapor-phase reduction using chromium dichloride, which was deposited over a niobium undercoat (page 48).

The present inventor was aware of unsuccessful attempts to coat uranium dioxide fuel pellet substrates with a zirconium diboride burnable poison by chemical vapor deposition in which the zirconium diboride adhered poorly to the uranium dioxide, resulting in spalling.

SUMMARY OF THE INVENTION

Briefly stated, the invention is directed towards a method for coating a zirconium diboride containing burnable poison on a uranium dioxide containing nuclear fuel. First, the nuclear fuel is coated with a layer containing niobium. Then, the niobium-containing layer is coated by chemical vapor deposition with a layer containing the burnable poison. The invention is also directed towards a zirconium diboride coated uranium dioxide nuclear fuel having a layer of niobium between the uranium dioxide substrate and the zirconium diboride layer.

BRIEF DESCRIPTION OF THE DRAWINGS

The subject matter of the invention is particularly pointed out and distinctly claimed in the concluding portion of this specification. The invention, however, both as to organization and method operation, together with further advantages thereof, may best be understood by reference to the following description taken in connection with the accompanying drawings in which:

FIG. 1 is a longitudinal sectional view of a fuel rod having a plurality of coated pellets of uranium dioxide.

FIG. 2 is a transverse sectional view along the lines II—II of FIG. 1.

DETAILED DESCRIPTION OF THE INVENTION

Nuclear fuel includes uranium in the form of uranium dioxide or mixed uranium-plutonium dioxide pellets each having a generally cylindrical configuration with an approximately one-third inch diameter and an approximately one-half inch length. Desirable zirconium diboride burnable poison coating thicknesses on the fuel pellets include a thickness of between about 8 and 16 microns (and preferably of between about 9 and 10 microns which corresponds to a target boron-10 loading of generally 1.5 mg per lineal inch).

Chemical vapor deposition (CVD) is a relatively fast coating process when compared with other techniques such as sputtering. Attempts were known to coat zirconium diboride on uranium dioxide pellets by CVD using zirconium tetrachloride and boron trichloride. The coating rate seemed slow at about 700° C. At about 800° C. the coating rate was satisfactory but when the coating cooled, it spalled. The maximum crack-free coating was about 2 to 3 microns which is far short of the desired 9 to 10 microns.

Applicant's invention permits a relatively thick CVD zirconium diboride coating on a uranium dioxide fuel pellet. In applicant's invention, as seen in FIGS. 1 and 2, a fuel rod 10, for use in a nuclear reactor fuel assembly, includes an elongated tube 12 having a top end plug 14 and a bottom end plug 16 providing an enclosed chamber 18 in which a plurality of fissionable fuel pellets 20 are placed in end-to-end abutment biased against the bottom end plug 16 by the action of a spring 22. The pellet 20 diameter is slightly less than that of the tube 12 and forms a clearance space 24. Both the spring 22 and clearance space 24 accommodate any thermal expansion of the pellets 20 during operation. In applicant's two step method, first a layer 28 of niobium is bondably deposited on the nuclear fuel pellet substrate 26, and then a layer 30 of zirconium diboride burnable poison is bondably deposited on the niobium layer 28 by chemical vapor deposition.

The niobium layer 28 may be applied by conventional means, as previously mentioned, and preferably by relatively fast chemical vapor deposition utilizing niobium pentachloride. The preferred thickness of the niobium layer 28 is between about 3 and 6 microns. Even with a slower conventional non-CVD coating procedure for the niobium layer, the overall coating time for a non-CVD niobium layer plus the CVD zirconium diboride layer will be less than utilizing a sngle step non-CVD zirconium diboride technique, remembering that a single step CVD zirconium diboride layer with the desired thickness will spall.

EXAMPLE

Uranium dioxide fuel pellet substrates 26 were coated by conventional CVD techniques first with niobium and then with zirconium diboride utilizing a vertical tube surrounding vertically stacked fuel pellets. The gaseous CVD precursors (niobium pentachloride for the niobium layer 28, and zirconium tetrachloride and boron trichloride for the zirconium diboride layer 30) were introduced into the bottom of the tube and the by-products were exhausted from the top of the tube. The fuel pellet substrates 26 had been cleaned by light sanding, repeated ultrasonic cleaning in distilled water, and vacuum drying. Thermocouples were mounted on the walls of the tube. The pellet substrates 26 were heated to a thermocouple-measured predetermined wall temperature by an upper furnace while the precursor gases were preheated to a thermocouple-measured preselected wall temperature by a lower furnace. Crack-free coatings were obtained under various conditions as summarized in Table 1. In Table 1, gaseous niobium pentachloride was prepared by vaporizing niobium pentachloride in a hydrogen stream, and gaseous zirconium chloride was prepared by reacting hydrogen chloride and zirconium and carrying the reaction products in a hydrogen stream.

TABLE 1

| | | | | | | | | | | |
|---|---|---|---|---|---|---|---|---|---|---|
| SUMMARY OF CONDITIONS FOR PREPARING Nb/ZrB$_2$ COATINGS | | | | | | | | | | |
| | | Run Time | Temperatures (°C.) | | Flows (Mole Percent) | | | | | Total Flow |
| Run. No. | Layer | (min) | Gas Preheat | Pellet Zone | BCl$_3$ | HCl | H$_2$ | NbCl$_5$ | ZrCl$_4$ | (cc/min) |
| 1 | Nb | 45 | 650 | 850 | — | — | 99.921 | 0.079 | — | 15632 |
| | ZrB$_2$ | 60 | 600 | 800 | 0.140 | 0.053 | 99.680 | — | 0.128 | 17098 |
| 2 | Nb | 59 | 650 | 850 | — | — | 99.942 | 0.058 | — | 17089 |
| | ZrB$_2$ | 37 | 600 | 805 | 0.279 | 0.204 | 99.298 | — | 0.220 | 17196 |
| 3 | Nb | 44 | 643 | 865 | — | — | 99.907 | 0.093 | — | 17136 |
| | ZrB$_2$ | 76 | 600 | 800 | 0.187 | 0.234 | 99.498 | — | 0.082 | 17114 |
| 4 | Nb | 60 | 650 | 840 | — | — | 99.942 | 0.059 | — | 17195 |
| | ZrB$_2$ | 30 | 605 | 805 | 0.279 | 0.204 | 99.298 | — | 0.220 | 17196 |
| 5 | Nb | 55 | 650 | 855 | — | — | 99.941 | 0.059 | — | 17280 |
| | ZrB$_2$ | 25 | 600 | 805 | 0.279 | 0.204 | 99.298 | — | 0.220 | 17196 |
| 6 | Nb | 81 | 650 | 843 | — | — | 99.959 | 0.041 | — | 17192 |
| | ZrB$_2$ | 27 | 600 | 804 | 0.279 | 0.204 | 99.298 | — | 0.220 | 17196 |
| 7 | Nb | 27 | 650 | 870 | — | — | 99.811 | 0.189 | — | 17112 |
| | ZrB$_2$ | 75 | 600 | 825 | 0.140 | 0.234 | 99.544 | — | 0.082 | 17106 |
| 8 | Nb | 65 | 650 | 843 | — | — | 99.920 | 0.080 | — | 17199 |
| | ZrB$_2$ | 37 | 602 | 803 | 0.279 | 0.204 | 99.298 | — | 0.220 | 17196 |
| 9 | Nb | 64 | 650 | 860 | — | — | 99.936 | 0.064 | — | 17105 |
| | ZrB$_2$ | 55 | 620 | 817 | 0.140 | 0.234 | 99.543 | — | 0.082 | 17106 |
| 10 | Nb | 71 | 650 | 850 | — | — | 99.949 | 0.052 | — | 17194 |

TABLE 1-continued

SUMMARY OF CONDITIONS FOR PREPARING Nb/ZrB$_2$ COATINGS

| Run. No. | Layer | Run Time (min) | Temperatures (°C.) Gas Preheat | Pellet Zone | Flows (Mole Percent) BCl$_3$ | HCl | H$_2$ | NbCl$_5$ | ZrCl$_4$ | Total Flow (cc/min) |
|---|---|---|---|---|---|---|---|---|---|---|
|  | ZrB$_2$ | 37 | 600 | 810 | 0.279 | 0.204 | 99.298 | — | 0.220 | 17196 |
| 11 | Nb | 69 | 650 | 848 | — | — | 99.956 | 0.044 | — | 17228 |
|  | ZrB$_2$ | 55 | 600 | 809 | 0.140 | 0.105 | 99.640 | — | 0.114 | 17101 |

Typically, the method of the invention is used to circumferentially surround (i.e., coat only the cylindrical wall of) the uranium fuel pellet substrates 26 with the niobium layer 28 and then the zirconium diboride layer 30. However, in some applications it may be desirable to coat the entire fuel pellet substrate 26, including its top and bottom surfaces. In other applications, it may be advantageous to coat only a portion of the nuclear fuel with the niobium and then coat only a part of the niobium layer with the zirconium diboride. Also, while the method of the invention may be used to produce a fuel pellet 20 having a uranium dioxide containing substrate 26 covered with a niobium containing layer 28 covered with a zirconium diboride containing layer 30, it is preferred that the uranium dioxide containing substrate 26, the niobium containing layer 28, and the zirconium diboride containing layer 30 consist essentially of uranium dioxide, niobium, and zirconium diboride, respectively. As is known to those skilled in the art, the terminology "uranium dioxide containing nuclear fuel" includes mixed uranium-plutonium dioxide.

It will be apparent that many modifications and variations are possible in light of the above teachings. It, therefore, is to be understood that within the scope of the appended claims, the invention may be practiced other than as specifically described.

I claim:

1. A method for coating a uranium dioxide containing nuclear fuel pellet with a zirconium diboride containing burning poison, comprising:
   (a) bondably depositing a layer containing niobium on at least a portion of said nuclear fuel pellet; and
   (b) then bondably depositing, by chemical vapor deposition, a layer of said burnable poison on at least a part of said niobium containing layer.

2. The method of claim 1, wherein said nuclear fuel pellet consists essentially of uranium dioxide.

3. The method of claim 1, wherein said niobium containing layer consists essentiallly of niobium.

4. The method of claim 1, wherein said niobium containing layer is deposited by chemical vapor deposition.

5. The method of claim 1, wherein said burnable poison layer consists essentially of zirconium diboride.

6. The method of claim 1, wherein said nuclear fuel pellet comprises generally cylindrical pellets each having a diameter of about one-third inch and a length of about one-half inch.

7. The method of claim 1, wherein said niobium containing layer has a thickness of between about 3 microns and about 6 microns.

8. The method of claim 1, wherein said burnable poison layer has a thickness of between about 8 microns and about 16 microns.

9. In a nuclear reactor fuel assembly having a fuel rod containing a burnable poison coated nuclear fuel pellet, said fuel pellet comprising:
   (a) a generally cylindrical substrate containing uranium dioxide;
   (b) a bondably deposited layer containing niobium covering at least a portion of said substrate; and
   (c) a bondably deposited burnable poison layer containing zirconium diboride covering at least a part of said niobium containing layer.

10. In a nuclear reactor fuel assembly having a fuel rod containing a burnable poison coated nuclear fuel pellet, said fuel pellet comprising:
   (a) a generally cylindrical substrate consisting essentially of uranium dioxide;
   (b) a bondably deposited layer consisting essentially of niobium circumferentially surrounding said substrate; and
   (c) a bondably deposited burnable poison layer consisting essentially of zirconium diboride circumferentially surrounding said niobium layer.

* * * * *